(12) United States Patent
Sasaki

(10) Patent No.: US 7,830,121 B2
(45) Date of Patent: Nov. 9, 2010

(54) BATTERY PACK

(75) Inventor: Taichi Sasaki, Fukushima (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 11/877,499

(22) Filed: Oct. 23, 2007

(65) Prior Publication Data
US 2008/0111520 A1    May 15, 2008

(30) Foreign Application Priority Data
Nov. 14, 2006  (JP) .................. P2006-307464

(51) Int. Cl.
*H02J 7/00* (2006.01)
(52) U.S. Cl. .................. 320/134; 320/106; 320/112
(58) Field of Classification Search .............. 320/134, 320/136
See application file for complete search history.

(56) References Cited

U.S. PATENT DOCUMENTS 6,208,117 B1 *  3/2001  Hibi ........................... 320/134
7,215,096 B2 *  5/2007  Miura et al. ................ 320/134
2003/0141847 A1 *  7/2003  Fujiwara ..................... 320/134

FOREIGN PATENT DOCUMENTS

JP         2003-125540         4/2003

* cited by examiner

*Primary Examiner*—Patrick J Assouad
*Assistant Examiner*—M'Baye Diao
(74) *Attorney, Agent, or Firm*—K&L Gates LLP

(57) ABSTRACT

A battery pack having a secondary battery; a measurement unit measuring a terminal voltage and a current of the secondary battery; a protection unit preventing the secondary battery from being overcharged when the terminal voltage measured by the measurement unit is equal to or higher than an overcharge detection voltage; and a control unit receiving the terminal voltage and current measured by the measurement unit, the control unit having a first mode and a second mode in which current is less consumed than the first mode. A voltage in a range of from a full charge voltage to less than the overcharge detection voltage is defined as a voltage threshold. The control unit changes from the first mode to the second mode when a state in which a transition requirement is satisfied lasts for a predetermined period of time.

11 Claims, 4 Drawing Sheets

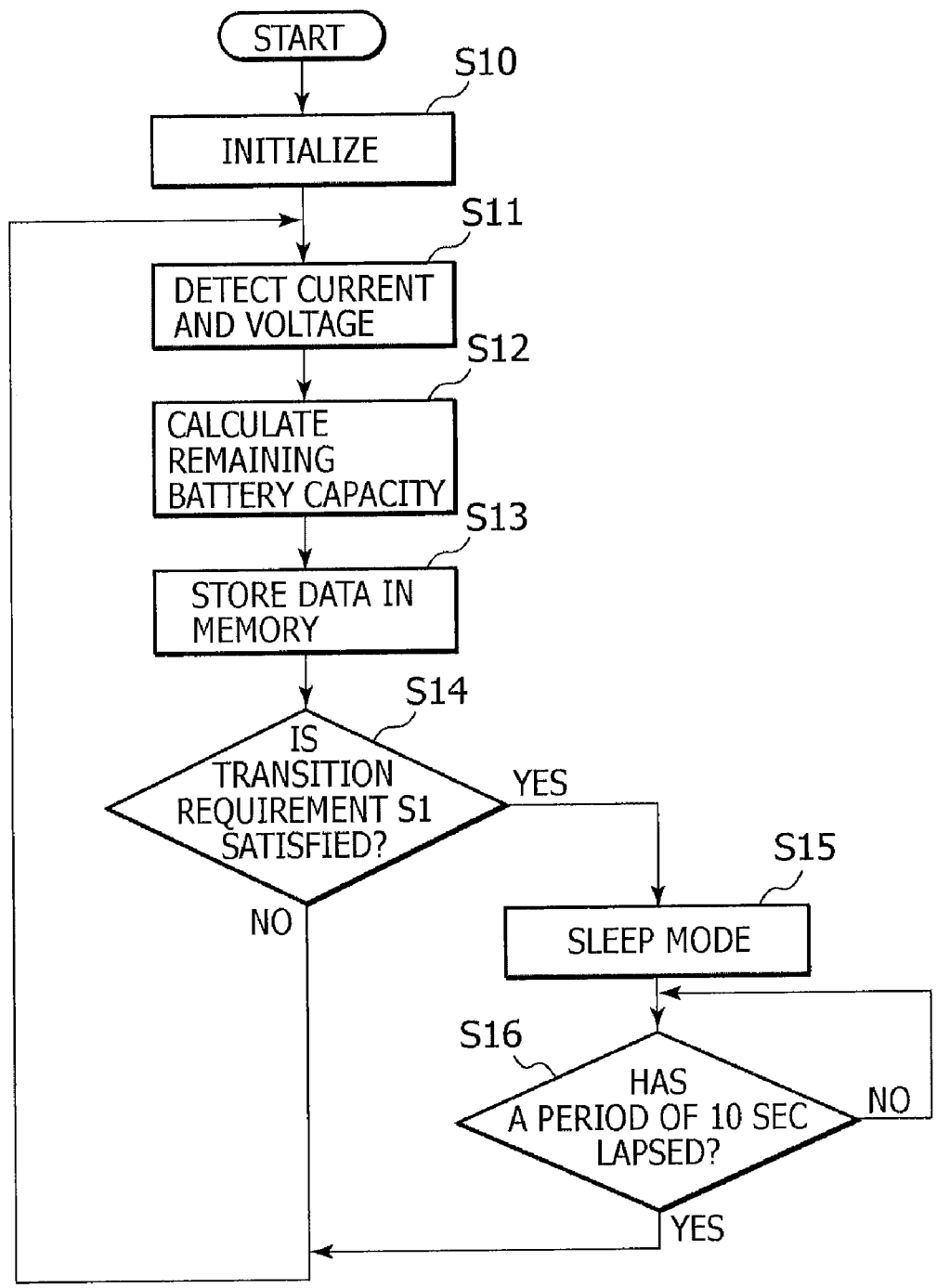

BATTERY PACK

CROSS REFERENCES TO RELATED APPLICATIONS

The present application claims priority to Japanese Patent Application JP 2006-307464 filed in the Japanese Patent Office on Nov. 14, 2006, the entire contents of which are incorporated herein by reference.

BACKGROUND

The present invention relates to a battery pack comprising, e.g., a lithium-ion secondary battery.

Currently, in many electric devices operated using a battery, a rechargeable secondary battery is applied, and is discharged and charged repeatedly. In a battery pack used in these devices, as charging and discharging operations are repeated, the secondary battery deteriorates, and even the battery in a full charge state cannot achieve a discharge capacity, or service capacity, of a new battery.

FIG. 1 shows the results of a cycle test in which a cycle of such charging and discharging operations is repeated that a lithium-ion secondary battery is charged at 4.1 V or 4.2 V, and allowed to stand in this high voltage state for a predetermined period of time, and then discharged until the voltage of the battery becomes 3.0 V. As can be seen from FIG. 1, in the lithium-ion secondary battery allowed to stand at 4.1 V, a remarkable reduction of the discharge capacity is not found even after the 300th cycle, whereas, in the lithium-ion secondary battery allowed to stand at 4.2 V, the discharge capacity begins to be reduced after the 200th cycle, and the discharge capacity is rapidly reduced after the 250th cycle. In this way, in the battery pack using, particularly a lithium-ion secondary battery as a secondary battery, there are some cases where the battery is likely to rapidly deteriorate when the secondary battery is allowed to stand for a long time in a state such that the battery voltage remains high.

Charging of a lithium-ion secondary battery is generally conducted by a method using constant current charging and constant voltage charging in combination. This method is employed to avoid a danger that the lithium-ion secondary battery in the full charge state continues to increase in battery voltage during the charging and the battery is consequently in an overcharge state and suffers temperature elevation or ignition. The constant current and constant voltage charging is performed as follows. At a battery voltage in a range of a predetermined voltage (e.g., $Vb=4.1$ V) or lower, constant current charging is conducted at a predetermined current (e.g., $Ib=500$ mA). At a battery voltage of larger than 4.1 V, a power source unit is constant voltage control-operated, so that the charging current Ib is gradually reduced. Then, the battery voltage Vb is increased to a predetermined output voltage (e.g., $Vo=4.2$ V) of the charge power source unit, thus completing the charging.

A method for detecting a state-of-charge of the secondary battery is described. As a method for detecting a state-of-charge, a method of a current detecting system and a method of a $\Delta V$ detecting system are known. The method of a current detecting system is a method such that, utilizing the reduction of the charging current Ib during the constant voltage control at the end of the charging, the charging current Ib is converted to a voltage Ex by means of a resistance and the voltage Ex is compared to a detecting voltage Ei to detect a state-of-charge. When the voltage Ex is equal to the detecting voltage Ei, the battery is judged to be in the full charge state. The resistance has a loss caused due to the charging current Ib, and therefore this method is effective for a device having a relatively small charging current Ib. The method of a $\Delta V$ detecting system is a method such that an output voltage Vo of a charge power source unit and a battery voltage Vb of the secondary battery are measured and, when a difference $\Delta V$ between them becomes a predetermined voltage (several mV), the battery is judged to be in the full charge state. The method of a $\Delta V$ detecting system detects a state-of-charge by measuring a voltage, and hence is effective for a device having a large charging current Ib.

When the full charge state is detected by the above detecting method, the charging is stopped. In the present specification, the term "full charge voltage" means a voltage at which a battery pack charged by a suitable charger is in the full charge state as mentioned above and the charging of the battery should be stopped.

A battery pack generally has a protection circuit including a charge/discharge control field effect transistor (FET) and an integrated circuit (IC) for monitoring the secondary battery and controlling the charge/discharge control FET. The protection circuit has an overcharge protection function.

The overcharge protection function of the protection circuit is now described. As mentioned above, safety of the lithium-ion secondary battery is secured by charging the lithium-ion secondary battery at a constant current and a constant voltage and at a charge control voltage equal to or lower than the rated voltage of the battery (e.g., 4.2 V). However, when a charger malfunctions or an unsuitable charger is used, there is a danger that the battery is overcharged. When the battery is overcharged and a battery voltage equal to or higher than the overcharge detection voltage (e.g., 4.325 V) is detected, the protection circuit turns off a charge control switching element, for example, a field effect transistor (FET), to cut off the charging current. This is the overcharge protection function. The overcharge detection voltage is a voltage at which the protection circuit cuts off the charging current.

Japanese Patent Application Publication (KOKAI) No. 2003-125540 describes that a battery pack in which protection function control means monitors a terminal voltage of a secondary battery, and, when it detects overcharge, it displays a warning to flow a self-consumed current, thereby lowering the voltage of the secondary battery to a safe voltage range as soon as possible.

SUMMARY

In a battery pack, an overcharge detection voltage at which a protection circuit serves as an overcharge protection circuit is set at a value higher than the full charge voltage of a secondary battery by about 0.1 V per single secondary battery (hereinafter, referred to as "single cell") and hence, even when the voltage of the secondary battery exceeds the full charge voltage, the protection circuit does not function unless the voltage becomes a value equal to or higher than the overcharge detection voltage. Therefore, the secondary battery is possibly charged until the voltage becomes a value equal to or higher than the full charge voltage and equal to or lower than the overcharge detection voltage, and further, when the secondary battery is allowed to stand in such a high voltage state, a problem occurs in that the secondary battery deteriorates as described above with reference to FIG. 1.

Accordingly, the present application provides a battery pack which is prevented from being allowed to stand in a high voltage state, thus making it possible to suppress deterioration of the secondary battery according to an embodiment.

According to an embodiment, there is provided a battery pack including: a secondary battery; a measurement unit; a protection unit; and a control unit. The measurement unit measures a terminal voltage and a current of the secondary battery. The protection unit prevents the secondary battery from being overcharged when the terminal voltage measured by the measurement unit is equal to or higher than an overcharge detection voltage. The control unit receives the terminal voltage and current measured by the measurement unit, and has a first operating mode and a second operating mode in which the consumed current is small, as compared to that in the first operating mode. In the battery pack, a voltage in a range of from the full charge voltage of the secondary battery to less than the overcharge detection voltage is defined as a voltage threshold. The control unit changes from the first operating mode to the second operating mode when a state in which a transition requirement is satisfied lasts for a predetermined period of time. The transition requirement is that the current measured by the measurement unit is smaller than a current threshold and the terminal voltage measured is equal to or smaller than the voltage threshold.

Additional features and advantages are described herein, and will be apparent from, the following Detailed Description and the figures.

BRIEF DESCRIPTION OF THE FIGURES

FIG. 4 is a flowchart showing a sequence of actions in one embodiment.

DETAILED DESCRIPTION

Figure 1:
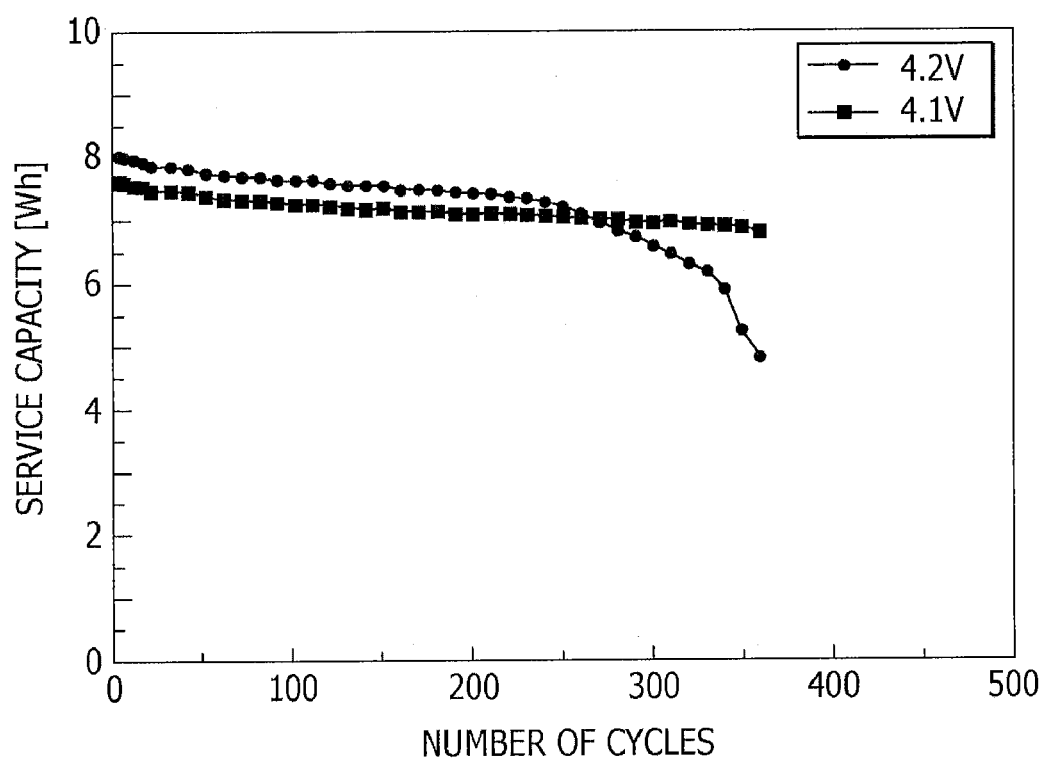
FIG. 1 is a graph for explaining an issue to be solved according to an embodiment.
Figure 2:
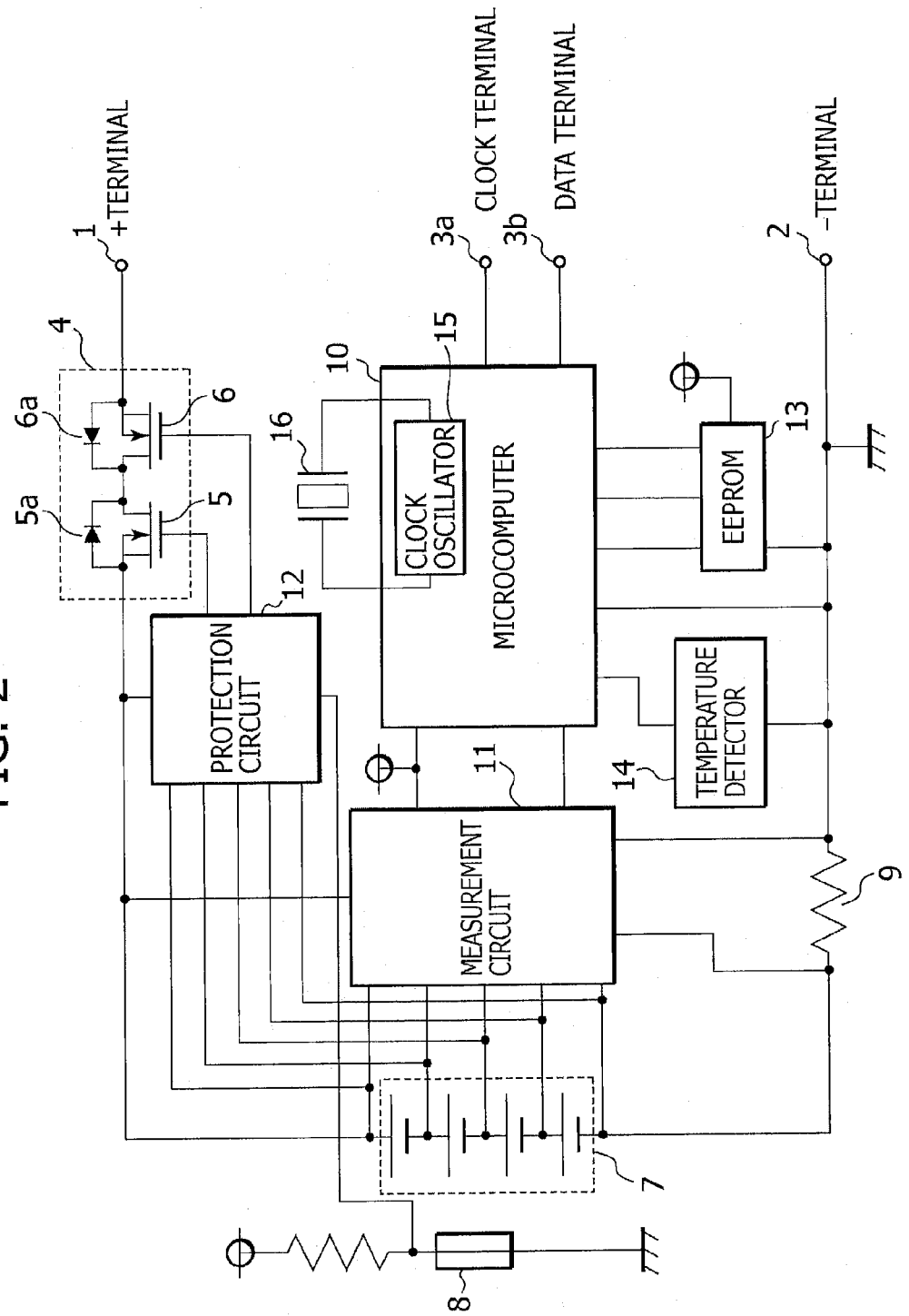
FIG. 2 is a block diagram of a battery pack according to one embodiment.

An embodiment will be described with reference to the accompanying drawings. FIG. 2 is a block diagram showing one example of the construction of a battery pack to which the present invention can be applied. A battery pack is mainly made up of a secondary battery 7, a microcomputer 10, a measurement circuit 11, a protection circuit 12, a switching circuit 4, a clock terminal 3a, and a data terminal 3b. When charging this battery pack, the battery pack is put in an electronic device body, an AC adapter, or the like, and a +terminal 1 and a −terminal 2 are respectively connected to a +terminal and a −terminal of a charger to conduct charging. When using the electronic device, in the same manner as in the charging, the +terminal 1 and −terminal 2 are respectively connected to a +terminal and a −terminal of the electronic device to conduct discharging.

The secondary battery 7 comprises four lithium-ion battery single cells connected in series. When a lithium-ion battery having a full charge voltage of 4.2 V per single cell is used, the battery pack in the present embodiment has a full charge voltage of 16.8 V.

The measurement circuit 11 is comprised of, for example, an integrated circuit (IC), and measures a terminal voltage of each unit cell of the secondary battery 7, and feeds the measurements to the microcomputer 10 and protection circuit 12. Using a current detection resistance 9, the magnitude and direction of a current are measured, and the results of measurement are fed to the microcomputer 10 and protection circuit 12.

The measurement of voltage and current is automatically conducted with a predetermined frequency. For example, in a below-mentioned normal mode, one measurement operation is made every one second, and, in the sleep mode, one measurement operation is made every 10 seconds. The measurement circuit 11 also functions as a regulator for stabilizing the voltage of the secondary battery 7 to generate a power source voltage.

A temperature detector 8 is made up of, for example, a thermistor, and monitors the temperature of the secondary battery 7. The result of measurement of the battery temperature is fed to the protection circuit 12, and, when the temperature of the secondary battery 7 becomes high, the circuit controls the battery so that the charging/discharging operation is stopped.

P-channel type field effect transistors (hereinafter, referred to simply as "FET"), functioning as a first FET 5 and a second FET 6, connected in series are inserted as the switching circuit 4 into a power source line on the positive side connecting the +terminal 1 to a positive electrode of the secondary battery 7. The first FET 5 and second FET 6 have a first parasitic diode 5a and a second parasitic diode 6a, respectively, between the respective drain and source. The parasitic diode 5a has a polarity in a direction opposite to a direction of the charging current flowing from the +terminal 1 toward the secondary battery 7 and in the same direction as the direction of the discharging current, and the parasitic diode 6a has a polarity in the same direction as the direction of the charging current and in a direction opposite to the direction of the discharging current.

The FET 5 is a charge control switching element, and the FET 6 is a discharge control switching element. A charge control signal is fed to the gate of the FET 5 from the protection circuit 12, and a discharge control signal is fed to the gate of the FET 6 from the protection circuit 12. Each of the FET 5 and FET 6 is of a P-channel type, and hence is turned ON by a gate potential lower than a source potential by a predetermined value or more.

The results of measurement of voltage and current detected by the measurement circuit and the results of measurement detected by the temperature detector 8 are fed to the protection circuit 12, and the FET 5 and FET 6 are controlled to be turned ON/OFF according to the results of measurement, thereby controlling charging or discharging of the secondary battery 7. The protection circuit 12 has a protection function to protect the secondary battery 7 from overcharge, over-discharge, or over-current.

The overcharge protection operation of the protection circuit 12 is first described. When the protection circuit 12 detects a terminal voltage of any one of the single cells of the secondary battery 7 increased to the overcharge detection voltage or higher, a charge control signal for turning OFF the FET 5 is fed to the gate of the FET 5 to cut off the charging current. On the other hand, the FET 6 remains ON. Therefore, a discharging current can flow through the FET 6 and the parasitic diode 6a. This protection operation can avoid the overcharge state. The overcharge detection voltage is set at a value larger than the full charge voltage by about 0.1 V per single cell, for example, is set so that the overcharge protection function works at a terminal voltage of 4.290 V per single cell.

When a load is connected and the secondary battery 7 is in an over-discharge state, the battery possibly breaks down. The protection circuit 12 detects a battery voltage reduced to the over-discharge detection voltage or lower, and turns OFF the FET 6 by a discharge control signal, cutting off the discharging current. On the other hand, the FET 5 remains ON, and hence a charging current can flow. The over-discharge detection voltage is set so that the over-discharge protection operation works at a terminal voltage of, for example, 2.4 V per single cell.

When short-circuiting occurs between the +terminal and −terminal of the secondary battery 7, a large current possibly flows to cause accidental temperature elevation. When a discharging current of a certain value or larger flows, the protection circuit 12 turns OFF the discharge control FET 6 to cut off the discharging current.

Although not shown in the figure, the FET 5 is connected to a power source line on the positive side, and the FET 6 may be connected to a power source line on the negative side. In the FET 6, the source is connected to the negative electrode of the secondary battery 7, and the drain is connected to the −terminal 2 of the power source unit. The parasitic diode 6a has a polarity in the direction opposite to the direction of the discharging current. In this instance, as the FET 6, an N-channel type FET, which is turned ON by a gate potential higher than a source potential by a predetermined value or more, is used.

Further alternatively, both the FET 5 and FET 6 can be inserted into the power source line on the negative side.

When the battery pack is put in an external electronic device, for example, a camcorder, the clock terminal 3a and data terminal 3b for communications receive a command from a microcomputer in the external electronic device, or transmit information about the battery capacity of the secondary battery 7 to the device. The electronic device which has received the information displays a charge capacity or a charge rate on a display portion, such as a liquid crystal display.

The microcomputer 10 calculates a remaining capacity of the secondary battery 7 using the voltage fed from the measurement circuit 11 with reference to a table for calculating the remaining capacity stored in an electrically erasable and programmable read only memory (EEPROM) 13 which is a nonvolatile memory. The remaining battery capacity may be calculated additionally using factors, such as a current input by the measurement circuit 11, and a temperature of the secondary battery 7 detected by a temperature detector 14 connected to the microcomputer 10. Data of the remaining battery capacity calculated is stored in a memory (not shown) in the microcomputer, such as a random access memory (RAM), and read out from the memory in response to a signal from the electronic device and sent to the electronic device through the clock terminal 3a and data terminal 3b. The microcomputer 10 has a clock oscillator 15. The clock oscillator 15 has a quartz oscillator 16, and generates clock as a standard of the timing of actions of the whole microcomputer 10.

The microcomputer 10 has operating states in two modes, i.e., a normal mode and a sleep mode, and the operating state is changed depending on the below-mentioned transition requirement. The clock oscillator 15 operates when the microcomputer 10 is in the normal mode, and stops when the microcomputer 10 is in the sleep mode. Therefore, the consumed current in the normal mode is increased, as compared to that in the sleep mode. For example, an average consumed current in the normal mode is 1.5 mA, whereas, an average consumed current in the sleep mode is 0.55 mA. The two modes can be achieved not only by operating/stopping the clock oscillator 15 but also by turning ON/OFF the power source of the whole microcomputer or part of the circuits.

Figure 3:
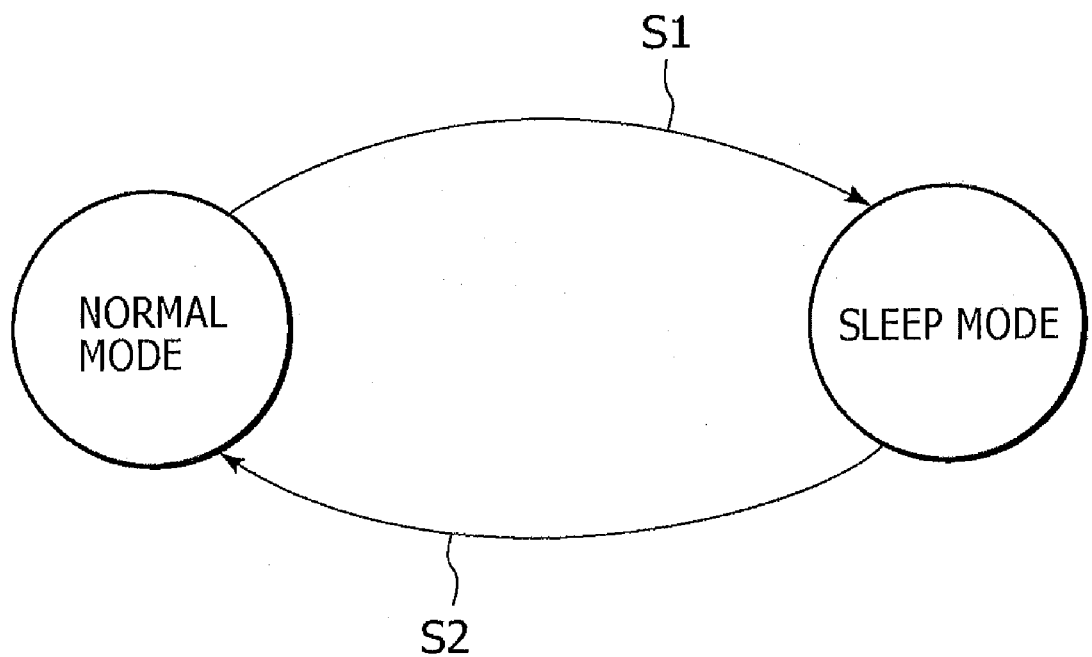
FIG. 3 is a diagram showing transition of a state in one embodiment.

The normal mode and sleep mode of the microcomputer 10 and the transition requirement therefor are described below with reference to FIG. 3. In the normal mode, the clock oscillator 15 is in operation as mentioned above. Further, the remaining capacity of the secondary battery 7 is calculated from the voltage measured by the measurement circuit 11 to be stored in a memory. The measurement of voltage and current and the calculation of the remaining battery capacity in the normal mode are conducted with a predetermined frequency, for example, once every one second. Further, the microcomputer 10 communicates with a microcomputer in an electronic device through the terminals 3a and 3b, and, for example, in response to a command from the electronic device, sends information of the remaining battery capacity to the electronic device.

In the sleep mode, the clock oscillator 15 is stopped as mentioned above, so that some functions of the microcomputer 10 are in a stop state. The sleep mode is changed to the normal mode with a predetermined frequency, for example, once every 10 seconds, and a current and a voltage are detected by the measurement circuit 11, so that the remaining capacity of the secondary battery 7 is calculated. When the current detected is less than a current threshold (e.g., 200 mA), that is, the battery is with no load, the mode is changed to the sleep mode again. Specifically, the sleep mode is intermittently changed to the normal mode with a predetermined frequency, and transition between the normal mode and the sleep mode is repeated. When the current detected is equal to or higher than the current threshold, the below-mentioned transition requirement S2 is satisfied and hence the sleep mode is changed to the normal mode.

When the transition requirement S1 is satisfied, the microcomputer 10 changes from the normal mode to the sleep mode. The transition requirement S1 is that a state in which all the requirements (A), (B), and (C) shown below are satisfied last for a predetermined period of time, for example, 10 seconds. The normal mode is changed to the sleep mode, thereby suppressing the consumed current.

(A) The charging/discharging current measured is less than a current threshold (e.g., ±200 mA)(with no load);

(B) The voltage of the secondary battery 7 is equal to or less than a voltage threshold (e.g., a terminal voltage of 4.2 V per single cell, an output voltage of 16.8 V of the battery pack); and (C) A command is not received through the terminals 3a and 3b.

The requirements (A) and (C) are required to prevent the battery from being uselessly consumed when calculation of the remaining battery capacity is not conducted, and the requirement (B) is required to prevent the battery from being allowed to stand in a high voltage state.

A voltage in a range of from the full charge voltage of the terminal voltage per single cell of the secondary battery 7 to less than the overcharge detection voltage is defined as a voltage threshold. When the voltage of the secondary battery 7 is equal to or higher than the voltage threshold, the microcomputer 10 is operated in the normal mode in which the consumed current is large, as compared to that in the sleep mode, making it possible to lower the voltage. When the voltage is equal to or higher than the overcharge voltage (e.g., a terminal voltage of 4.29 V per single cell), the overcharge protection function of the protection circuit 12 becomes effective to inhibit the charging.

When either one of the transition requirements S2 is satisfied, the microcomputer 10 changes from the sleep mode to the normal mode. The transition requirements S2 are:

(a) A charging/discharging current equal to or higher than a current threshold (±200 mA) is detected, or (b) A command is received through the terminals 3a and 3b.

By switching the normal mode and the sleep mode depending on the transition requirement S1 or S2 as mentioned above, the following effect can be obtained. When the battery pack is allowed to stand in a high voltage state, the secondary battery 7 considerably deteriorates. However, in the embodiment of the present application, a voltage in the range of from the full charge voltage of the secondary battery 7 to less than the overcharge detection voltage is defined as a voltage threshold, and, when the measured voltage of the secondary battery 7 exceeds the voltage threshold, the microcomputer 10 is operated in the normal mode in which the consumed current is large, so that the voltage of the battery pack can be rapidly lowered even with no load. Thus, the battery pack is prevented from being left in a high voltage state for a long time, making it possible to suppress deterioration of the battery 7. In the above-mentioned embodiment, the voltage threshold is equal to the full charge voltage, but the voltage threshold may be any voltage as long as it falls within the range of from the full charge voltage to less than the overcharge detection voltage.

In the sleep mode, the power consumption is smaller than that in the normal mode, making it possible to suppress wastage of the secondary battery 7.

The sequence of operations in the above-mentioned embodiment of the present application is described below with reference to the flowchart of FIG. 4.

In a step S10, the microcomputer 10 and the measurement circuit 11 are first initialized. Then, the measurement circuit 11 detects a current and a voltage of the battery pack in step S11.

The current and voltage detected in step S11 are sent to the microcomputer 10, and, using the results of detection, the remaining battery capacity is calculated with reference to the table for calculating the remaining battery capacity stored in the EEPROM 13 in step S12. Data of the remaining battery capacity calculated is stored in a memory in the microcomputer in step S13, and, for example, in response to a command from an electronic device, the data is sent to the electronic device.

Next, in step S14 the microcomputer 10 in the normal mode judges whether or not the above-mentioned transition requirement S1 is satisfied. When the requirement S1 is satisfied, the microcomputer 10 changes to the sleep mode in step S15. When the requirement S1 is not satisfied, the microcomputer 10 remains in the normal mode, and the process goes back to step S11 where detection of a current and a voltage is conducted again. In the sleep mode, the clock oscillator 15 stops operating, and part of the functions of the microcomputer 10 are stopped, so that the consumed current is reduced, as compared to that in the normal mode.

Next, in step S16, the microcomputer judges whether or not a period of 10 seconds has lapsed after the microcomputer 10 changes its mode to the sleep mode. When the microcomputer determines that a period of 10 seconds has not lapsed, the microcomputer 10 remains in the sleep mode. When the microcomputer determines that a period of 10 seconds has lapsed, the microcomputer 10 changes from the sleep mode to the normal mode, and the process goes back to step S11 where detection of a current and a voltage is conducted again.

In the sleep mode, the mode is changed to the normal mode and detection of the current and voltage is carried out every 10 seconds. When the current detected is less than the current threshold, the mode is changed to the sleep mode again. When the current detected is equal to or higher than the current threshold, the transition requirement S2 is judged to be satisfied, so that the mode is changed to the normal mode. When a command from an external electronic device is received in the sleep mode (not shown), the transition requirement S2 is satisfied, and therefore the microcomputer 10 changes its mode to the normal mode.

According to an embodiment, the terminal voltage of the secondary battery can be controlled to be a voltage threshold or less, which falls in the range of from the full charge voltage to less than the overcharge detection voltage. Therefore, even when the battery pack is left in a state such that the voltage is higher than the voltage threshold, the voltage is automatically lowered to the voltage threshold or less to prevent the battery pack from being kept in a high voltage state, thereby making it possible to prevent rapid deterioration of the battery pack.

It should be appreciated that present application is not limited to the above-mentioned embodiment, and the present application can be changed or modified based on the technical concept thereof. For example, values of voltage and others mentioned in the above embodiment are merely examples, and values different from them may be used if necessary.

In addition to a lithium ion battery, the present application can be applied to various batteries, such as a Ni—Cd (nickel-cadmium) battery and a Ni-MH (nickel-hydrogen) battery.

The microcomputer constituting the battery pack may function as a protection circuit.

The terminal voltage of the secondary battery mentioned above may be controlled by a circuit construction other than the microcomputer. It is noted that, when the microcomputer is used, the voltage can be lowered by operating the microcomputer in the normal mode, which is advantageous in that no special discharge circuit is needed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a secondary battery;
a measurement unit for measuring a terminal voltage and a current of the secondary battery;
a protection unit for preventing the secondary battery from being overcharged when the terminal voltage measured by the measurement unit is equal to or higher than an overcharge detection voltage; and
a control unit to which the terminal voltage and current measured by the measurement unit are input, the control unit having a first operating mode and a second operating mode in which the consumed current is small, as compared to that in the first operating mode, wherein:
a voltage in a range of from a full charge voltage of the secondary battery to less than the overcharge detection voltage is defined as a voltage threshold,
the control unit changes from the first operating mode to the second operating mode when a state in which a transition requirement is satisfied lasts for a predetermined period of time, and
the transition requirement is that the current measured by the measurement unit be smaller than a current threshold and the terminal voltage measured be equal to or smaller than the voltage threshold.

2. The battery pack according to claim 1, wherein:
the second operating mode is intermittently changed to the first operating mode so that the measurement unit measures the current, and the second operating mode is changed to the first operating mode when a transition requirement that the current measured be equal to or higher than the current threshold is satisfied.

3. The battery pack according to claim 1, wherein the control unit calculates the remaining capacity of the secondary battery in the first operating mode.

4. The battery pack according to claim 1, wherein:
the control unit is a microcomputer, and
the second operating mode is achieved by stopping the operation of a clock oscillator in the microcomputer.

5. The battery pack according to claim 1, wherein:
the control unit is a microcomputer,
the microcomputer is capable of communicating with an external device, and
the transition requirement for changing the first operating mode to the second operating mode includes a requirement that the microcomputer receive no command from the external device.

6. The battery pack according to claim 2, wherein:
the control unit is a microcomputer,
the microcomputer is capable of communicating with an external device, and
the second operating mode is changed to the first operating mode when the microcomputer receives a command from the external device.

7. The battery pack according to claim 1, further comprising a switching unit in a power source line on the positive side connecting a +terminal and a positive electrode of said secondary battery, wherein:
the switching unit includes a first field effect transistor and a second field effect transistor connected in series,
the first field effect transistor and the second field effect transistor have a first parasitic diode and a second parasitic diode, respectively, between the respective drain and source,
the first parasitic diode has a polarity in a direction opposite to a direction of a charging current flowing toward the battery from the +terminal and in the same direction as a direction of a discharging current, and
the second parasitic diode has a polarity in the same direction as the direction of the charging current and in the direction opposite to the direction of the discharging current.

8. The battery pack according to claim 7, wherein:
the first field effect transistor is a charge control switching element,
the second field effect transistor is a discharge control switching element,
a charge control signal is fed to a gate of the first field effect transistor from the protection circuit, and
a discharge control signal is fed to a gate of the second field effect transistor from the protection circuit.

9. The battery pack according to claim 7, wherein:
each of the first field effect transistor and the second field effect transistor is of a P-channel type, and is turned ON by a gate potential lower than a source potential by a predetermined value or more.

10. The battery pack according to claim 1, wherein:
a measurement result of the terminal voltage and current measured by the measurement circuit and a measurement result detected by a temperature detector are fed to the protection unit, and
the first field effect transistor and the second field effect transistor are controlled to be turned ON/OFF depending the results of measurement, to control charging or discharging of the secondary battery.

11. The battery pack according to claim 1, wherein:
the protection unit has a protection function to protect the secondary battery from overcharge, over-discharge, or over-current.

* * * * *